(12) United States Patent
Yazdanfar et al.

(10) Patent No.: US 8,144,410 B2
(45) Date of Patent: *Mar. 27, 2012

(54) MULTIMODAL OPTICAL IMAGING

(75) Inventors: Siavash Yazdanfar, Niskayuna, NY (US); Vernon Thomas Jensen, Draper, UT (US); Stephen Johnson Lomnes, Philadelphia, PA (US)

(73) Assignee: General Electric Company, Niskayuna, NY (US)

( * ) Notice: Subject to any disclaimer, the term of this patent is extended or adjusted under 35 U.S.C. 154(b) by 176 days.

This patent is subject to a terminal disclaimer.

(21) Appl. No.: 12/263,673

(22) Filed: Nov. 3, 2008

(65) Prior Publication Data

US 2010/0110572 A1    May 6, 2010

(51) Int. Cl.
*G02B 5/22* (2006.01)
*A61B 1/06* (2006.01)

(52) U.S. Cl. ......... 359/891; 359/892; 632/574; 600/181

(58) Field of Classification Search .................. 362/574
See application file for complete search history.

(56) References Cited

U.S. PATENT DOCUMENTS

| | | | | |
|---|---|---|---|---|
| 5,402,326 | A | * | 3/1995 | Belliveau ...................... 362/284 |
| 5,993,037 | A | * | 11/1999 | Tomioka et al. ............... 362/583 |
| 6,068,592 | A | * | 5/2000 | Davis ............................. 600/132 |
| 6,821,245 | B2 | | 11/2004 | Cline et al. |
| 6,872,214 | B2 | | 3/2005 | Sonnenschein et al. |
| 6,899,675 | B2 | | 5/2005 | Cline et al. |
| 6,997,871 | B2 | | 2/2006 | Sonnenschein et al. |
| 7,306,533 | B2 | * | 12/2007 | Ito ..................................... 475/5 |
| 2005/0050707 | A1 | | 3/2005 | Scott et al. |
| 2005/0129108 | A1 | | 6/2005 | Bendall et al. |

* cited by examiner

*Primary Examiner* — Jade R Chwasz
(74) *Attorney, Agent, or Firm* — Fletcher Yoder

(57) ABSTRACT

Multimodal optical imaging is disclosed. Possible devices include a filter assembly that is capable of rotary action during real time image acquisition. Systems are disclosed that include such filter assemblies, which are detachable or integrated in the systems. Various techniques for capturing image targets using multiple light sources such as white light and fluorescent light are also disclosed.

21 Claims, 5 Drawing Sheets

MULTIMODAL OPTICAL IMAGING

BACKGROUND

The invention relates generally to the field of imaging and more specifically to the field of multimodal optical imaging.

Various imaging techniques have been developed for use in a wide range of applications. For example, in modern healthcare facilities, imaging systems are often used for identifying, diagnosing, and treating physical conditions.

A scope is an optical imaging device that provides real-time views. Although most scopes are designed for direct visual inspection with brightfield (white light) imaging, other detection modalities including narrow band illumination, luminescence (e.g., fluorescence and phosphorescence), and imaging of light outside the visible wavelength range have emerged.

For example, fluorescence endoscopy utilizes differences in the fluorescence response of healthy diseased tissue. The fluorophores that are excited during fluorescence endoscopy may be exogenously applied agents that accumulate preferentially in disease-associated tissues, or they may be the endogenous fluorophores that are present in all tissue. In the latter case, the fluorescence from the tissue is typically referred to as autofluorescence. Tissue autofluorescence is typically due to fluorophores with absorption bands in the UV and blue portion of the visible spectrum and certain emission bands in the green to red portions of the visible spectrum.

Another example is to use a fluorescent dye for inspection of defects in manufactured parts such as shaped metals. One or more dyes may be applied to the surface under study and, penetrating into defects such as material stress fractures. After removal of excess dye, the penetrant is excited by an excitation light source and the resulting fluorescence detected with an imaging system such as a borescope or a camera. White light inspection allows for direct visual inspection of the part, whereas fluorescence of the penetrant highlights defects.

It is therefore desirable to provide devices and techniques that enable scopes to perform multimodal optical imaging.

BRIEF DESCRIPTION

Provided herein are multimodal imaging systems comprising filter assemblies comprising at least one filter positioned on the flat face of a disk, one or more light access sites, a retaining ring enclosing the disk; and one or more rotational actuators positioned between the exterior surface of the disk and the interior surface of the annular ring. The elements of the filter assemblies are configured such that the plurality of rotational actuators (e.g., a micro motor, a piezoelectric motor, and a micro electromechanical motor) are adapted to engage the exterior vertical surface of the disk to rotate the disk within the annular ring. The filter may include an emission filter, an excitation filter (e.g., a fluorescent filter, a notch filter, a band pass filter, or a multiple band pass filter) or both an emission filter (e.g., a fluorescent filter, a notch filter, a band pass filter, a multiple band pass filter, or a combination thereof) and an excitation filter. The filter assemblies may further comprise one or more access apertures position on the flat face of the disk.

In some embodiments, the disk further comprises one or more access apertures such as light access sites. The access apertures may be sized according to the particular scope geometries. In some embodiments, the access aperture has a diameter less than 4 mm. In some alternative embodiments, the light access has a diameter less than 4 mm.

In some embodiments, the exterior surface of the disk and the outer diameter of the rotational actuators include a plurality of grooves that interleave to rotate the disk of the annular ring when the rotational actuator applies rotational force.

In some embodiments, the assemblies comprise an attachment element positioned at the proximal end of the cylindrical tube. Attachment elements may comprise a cylindrical lip for a friction fit with the exterior of a scope, a threaded screw cap with mated friction fit lip for reversible attachment to the distal end of a scope.

Also provided are methods of multimodal image acquisition using the systems of the invention.

FIGURES

These and other features, aspects, and advantages of the present invention will become better understood when the following detailed description is read with reference to the accompanying drawings in which like characters represent like parts throughout the drawings, wherein:

FIG. 1 depicts a representative disk (12) component of the filter assembly in which an excitation filter (14) and an emission filter (16) cover portions of the disk surface for alignment with sensor (S) and light source (LS) components of a scope. FIG. 1A shows the disk (12) in non-filtration mode where the light access sites (18) enables light transmission and FIG. 1B shows the disk in filtration mode.

FIG. 2 depicts a representative disk (12) in which an excitation filter (14) and an emission filter (16) occupy discrete portions of disk (12) surface for alignment with sensor (S) and light source (LS) components of a companion scope. Also shown in FIG. 2 is an access aperture (20) that provides a pass-through for light, gases, or liquids. FIG. 2A shows the disk in filtration mode and FIG. 2B shows the disk in non-filtration mode.

DETAILED DESCRIPTION

The present techniques and devices are generally directed to multimodal optical imaging systems that may be employed in a variety of imaging contexts. The present devices are generally directed to filter assemblies and filter systems that enable single detector systems to perform multimodal imaging techniques. The devices and methods provided herein may be employed in a variety of imaging contexts such as hand-held devices, borescopes, endoscopes, or microscopes.

Figure 1A:
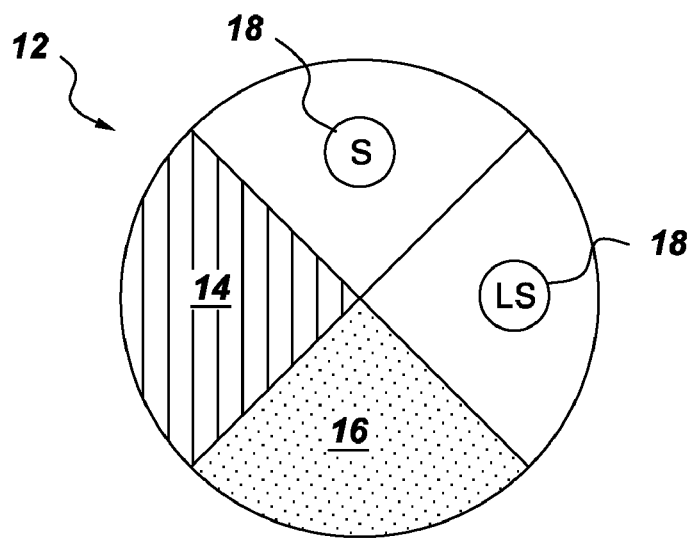
Figure 1B:
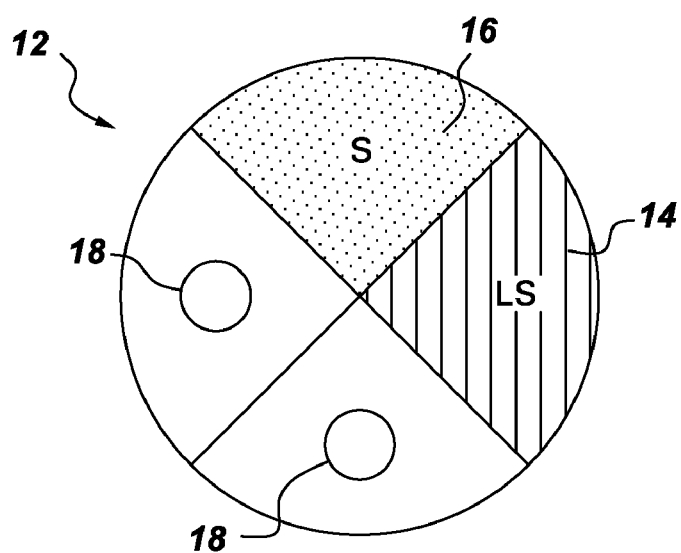
Figure 2A:
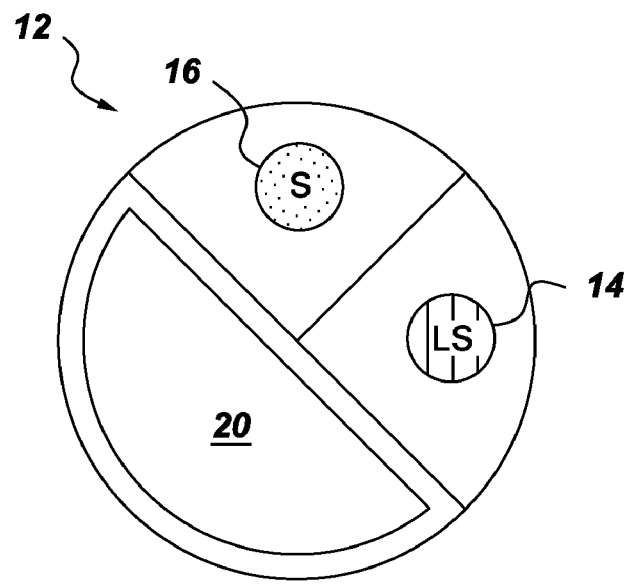
Figure 2B:
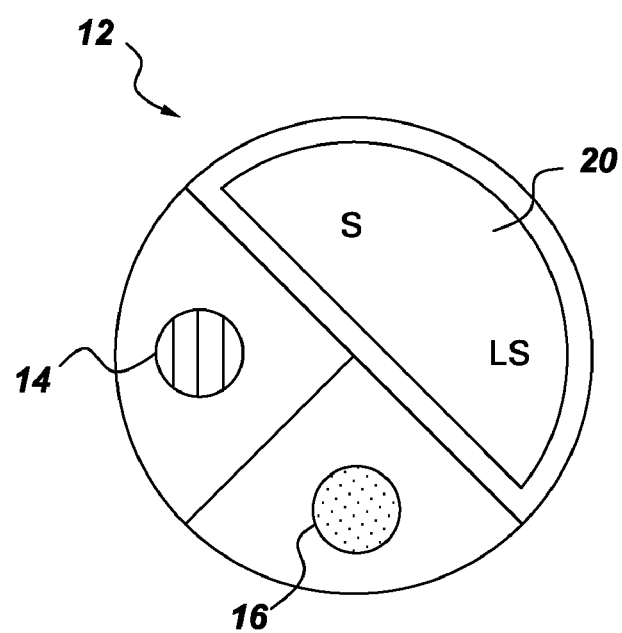
Figure 3A:
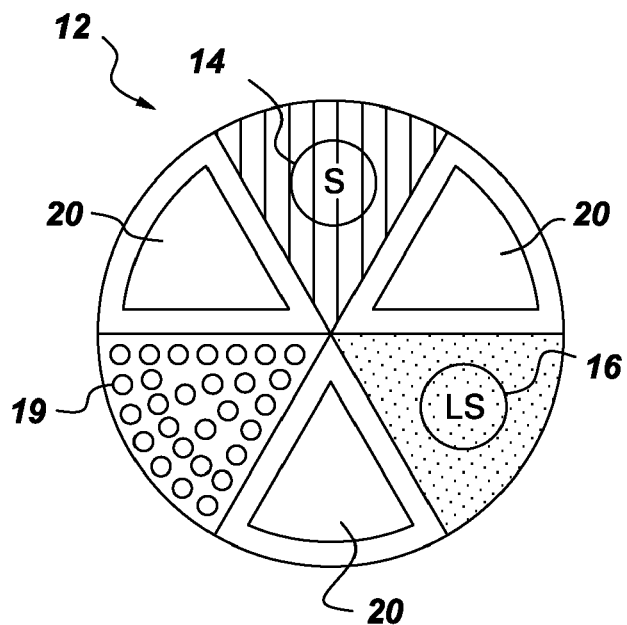
FIG. 3 depicts a representative disk (12) including light filters (14, 16) and access apertures (20) that may be used to pass light, devices, liquids, or gases through the filter assembly. Also shown in FIG. 3A is an optional void segment (19) that may be used as an insertion site for an additional filter or left open as an access site.
Figure 3B:
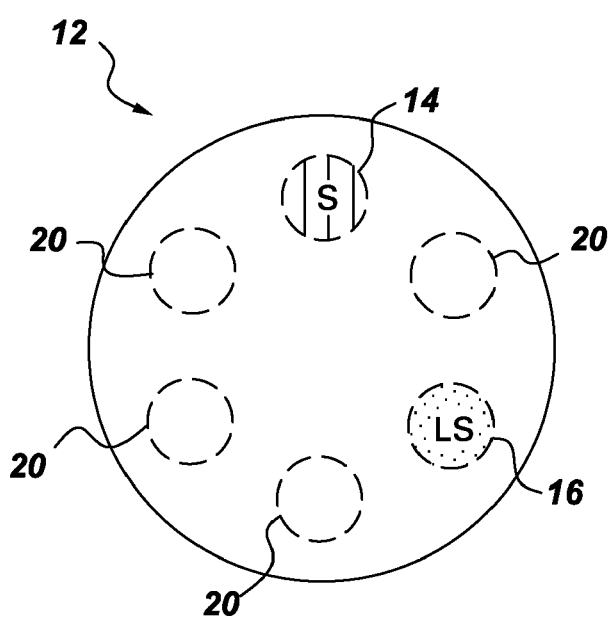

FIG. 1 depicts a representative disk (12) component of the filter assembly in which an excitation filter (14) and an emission filter (16) cover a portion of the disk surface. FIG. 1A shows the disk (12) in non-filtration mode and FIG. 1B shows the disk in filtration mode. The two operating modes are indicated in the figures by alignment with the sensor (S) and light source (LS) components of a companion scope. The filter assembly may be reversibly attached to a companion scope via an attachment element. Alternatively, the filter assembly may be integrated with a companion scope.

Although the embodiment depicted in FIG. 1 show quarter sections, any geometric configuration may be employed that provides the desired combination of filters and access apertures. Thus, the disk may be segmented into uneven sections, pie-shaped sections or circular sections or any other configuration suitable for use with a selected companion scope.

Multiple light access sites (18) or access apertures (20) may be positioned on the disk relative to the filters such that neither the light source nor the sensor is occluded during image capture.

The excitation filter (14) conditions the light passing from a light source (LS) to the image target. Accordingly, the excitation filter may comprise a fluorescence excitation filter, a notch filter, a bandpass filter, or a multiple bandpass filter. In some embodiments, the excitation filter tunes white light, for example by remove red wavelengths of white light for narrow band imaging. In some embodiments, the excitation filter may be a narrow band filter that selectively restricts certain white light wavelengths for example, restricting red wavelengths of white light for narrow band imaging. Alternatively, the excitation filter may selectively enhance selected features of the image target, for example a fluorescent filter that tunes the light from the light source to a specified wavelength range.

In embodiments where the filter assembly is mated to one of more light sources, the number of excitation filters may match the number of light source ports on a companion scope. For example, at least two excitation filters (e.g. a white light filter and a fluorescence filter) may be used for bimodal optical imaging embodiments. In some other embodiments, the excitation filter (14) may cover a surface area of the disk (12) that is larger than the surface area of the corresponding light source outlet. In some embodiments, the excitation filter (16) is an excitation filter covering one section of the disk (12). In some other embodiments, the excitation filter (16) is an emission filter (16) covering one quarter of the disk (12). In yet other embodiments, the sections of the disk (12) comprise a pair of illumination filters: one excitation filter and one emission filter (16). In the exemplified quartered disk embodiments the remaining two quarters may be either an open void or a portion of the covered with a light transmissive material such as glass or plastic.

The emission filters (16) may include filters corresponding to the three basic color components of white light such as a red filter (R), a green filter (G), and a blue filter (B). Alternatively, the filters may include filters corresponding to the three complementary color components of white light such as a cyan filter (C), a magenta filter (M), and a yellow filter (Y).

The number of emission filters may be selected to match the number of sensors on the companion scope. For example, when the companion scope has a single sensor, the disk need only include a single emission filter.

In some embodiments, the emission filter (16) may cover a surface area of the disk (12) that is larger than the surface area of the corresponding sensor. For example, the excitation filter may be an excitation filter covering one quarter of the disk.

In quartered disk configurations such as the one depicted in FIG. 1, the remaining two quarters may be either open (i.e., an access aperture) or covered with a light transmissive material such as glass or plastic (i.e., a light access site).

The filter assembly includes one or more light access sites (18) disposed in the disk (12). In some embodiments, the light access sites may be apertures in the disk. In some alternative embodiments, sensor access point may comprise light-transmissive segments of the disk, for example segments made of optical glass or plastic.

In embodiments where the filter assembly has a single light access point, the light access site is large enough to provide light transmission without occluding the sensor to which the filter assembly is attached. When the filter assembly has multiple discrete sensor access sites, the light access sites are sized and positioned within the disk such that the filter assembly transitions from one optical imaging mode (e.g., white light imaging) to another optical imaging mode (e.g., fluorescent imaging) when the disk of the filter assembly is rotated a predetermined number of degrees.

In some embodiments, the disk (12) of the filter assembly includes one or more access apertures adapted to permit air, fluid, or devices to traverse the disk. The access one or more access apertures may be positioned adjacent to the sensor aperture to apply water or air to the sensor. In some specific embodiments, the access aperture is a light access sites that may comprise a void in the disk that is matched in size and shape to a sensor or a light source on a scope. In alternative embodiments, the light access sites comprise a light-transmissive material.

The excitation filter (14), the emission filter (16), the light access sites (20), and the access aperture (22) are positioned relative to each other so that rotation of the disk shifts the assembly from non-filtering mode to filtering mode without occluding the light source, the light sensor, or optional access apertures on a companion scope.

The excitation filters and emission filters are positioned on the horizontal face of a disk, which is disposed in an annular retaining ring. The retaining ring may include a ridge that holds the disk in place while permitting the disk to rotate both clockwise and counterclockwise within the annular ring. Both the retaining ring and the disk are positioned at the distal end of the filter assembly. The distal end of the filter assembly is the leading end of the assembly that is directed at the imaging target. Thus, the distal end is opposite the light source and sensor of the companion scope.

During operation the user may manually turn the mechanical rotational actuators to rotate the disk within the retaining ring. Alternatively, the rotational actuators (24) may be motor-driven (e.g., using minimotors, micromotors, or piezoelectric elements).

The retaining ring (22) may also include an inner planar surface and an outer planar surface. The inner planar surface may be circular to permit easy rotary motion of the disk (12). The outer planar surface of the retaining ring may be selected to match the shape and size of the imaging system that the filter assembly can be coupled with. Thus, if the light source is part of a borescope, endoscope, or other device with a cylindrical distal end, the outer planar surface of the retaining ring may be circular. Likewise, if the light source is part of a device with a square or rectangular shape, the outer planar surface of the retaining ring may also be square or rectangular, respectively.

Figure 4C:
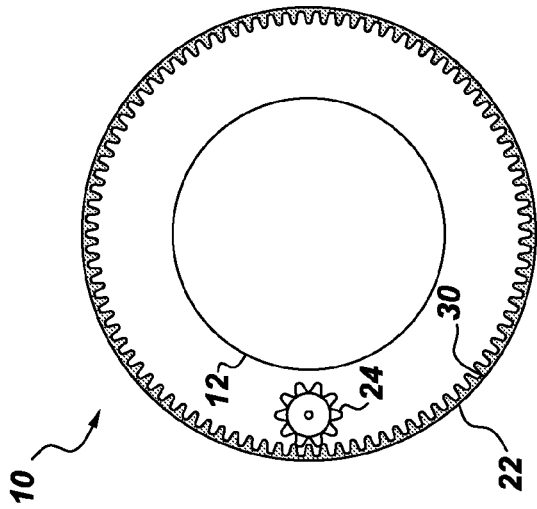
FIG. 4 depicts a disk (12) of the filter assembly positioned within a retaining ring, in which an actuator (24) is seated between the disk (12) and the retaining ring (22).
Figure 4B:
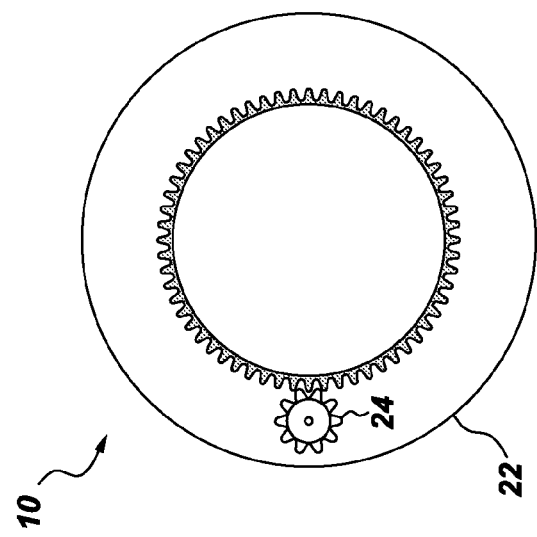
Figure 4A:
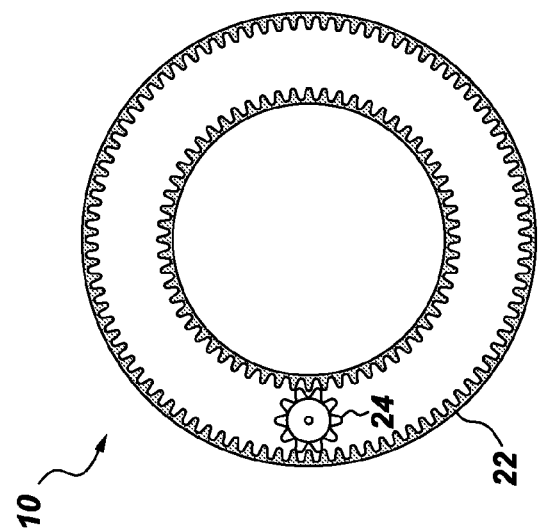
Figure 5:
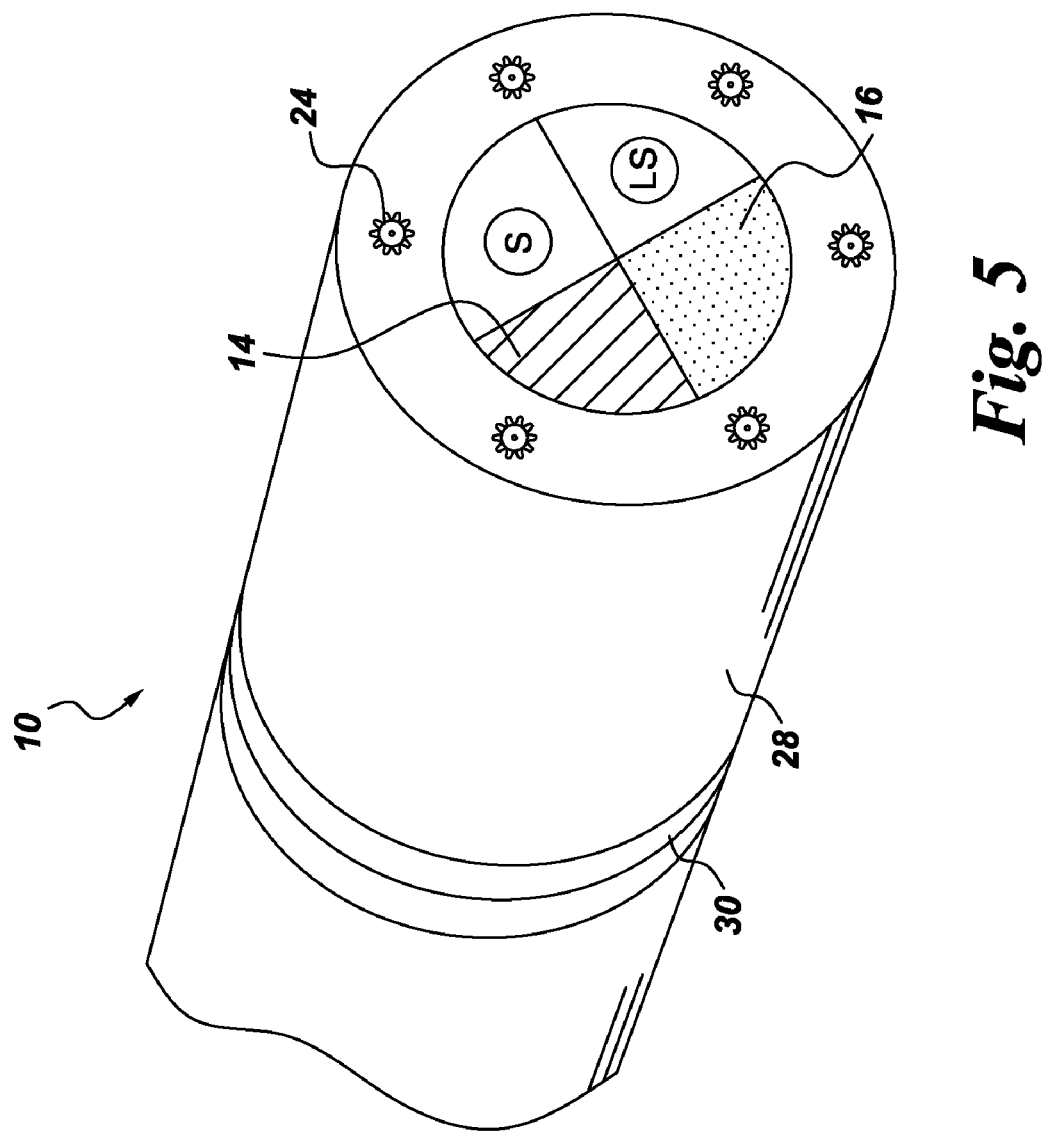
FIG. 5 depicts a representative filter assembly (10) attached to the distal end of a tubular scope (36) through an attachment element (34).

The filter assembly includes one or more rotational actuators (24) adapted to engage the exterior vertical surface of the disk (12) to rotate the disk within the retaining ring. The rotational actuators may be mechanical or electro-mechanical. The actuators may comprise an engaging element such a grooved wheel that interleaves with grooves (26) on the disk, the retaining ring, or both the disk and the retaining ring. Three possible embodiments are depicted in FIG. 4. In FIG. 4A, the interleaving grooves (26) are present on the inner surface of the retaining ring. In FIG. 4B the interleaving grooves are present on the outer planar surface of the disk. In FIG. 4C the grooves (26) are present on both the inner surface of the retaining ring and the outer planar surface of the disk.

The retaining ring may further include a tubular extension section (28) that is perpendicular to the flat surface of the retaining ring. In embodiments where the outer planar surface of the retaining ring is substantially cylindrical, the tubular extension section may also be substantially cylindrical. Likewise, when the outer planar surface of the retaining ring is square or rectangular in shape, the tubular extension section may also be square or rectangular, respectively.

An attachment element (30) may be positioned at the proximal end of the retaining ring. In some embodiments, the attachment element has threading on the internal surface of the tubular extension that releasably or non-releasably mates with threading on the external surface of the scope. In alternative embodiments, the attachment element has a circular groove on the internal surface of the tubular extension that that releasably or non-releasably mates with a matching protrusion on the external surface of the scope to create a friction fit. In some other embodiments, the scope and the tubular extension have threads at their distal and proximal ends respectively such that the tubular extension can be screwed onto distal end of the scope.

In system embodiments, the filter assembly (10) is attached to the distal end of a scope such as an endoscope, a laparoscope, or borescope. In some embodiments, the illumination sources illuminate the specimen with a visible light and an excitation light. The excitation light may be a wavelength selected to induce luminescence in the specimen via intrinsic luminescence. Alternatively, the excitation light may be a wavelength selected to induce luminescence in a luminescence agent administered to the subject so as to come into contact with the specimen. In certain embodiments, the visible light and the excitation light may be multiplexed in time.

The specimen may scatter or emit light detectable by two or more optical modalities upon being illuminated by the light. The light may be emitted from the specimen via agent-induced luminescence or auto-luminescence. The light emitted by luminescence may be in near infrared spectral region or in visible spectral region based on the specimen and the type of luminescence agent administered into the specimen.

The scattered or emitted light may be detected via a single detector, such as a CCD detector or a CMOS detector. Any known collection mechanism may be employed by present technique to collect the scattered or emitted light from the specimen and deliver the same to the detector. In certain embodiments, the detector may be disposed within the probe (distal end of the scope). Alternatively, the detector may be disposed within the body (midsection or attached to the proximal end of the scope) to receive the emitted or scattered light from the specimen through the light delivery and collection subsystem. In addition to the fiber optic cables and the optical devices, the light delivery and collection subsystem may also include a notch or a cut filter disposed adjacent to the detector on a light-incident side and configured to block the scattered excitation light.

A single detector may be adapted to detect scattered or emitted light coming from the specimen and detectable by each of the two or more optical imaging modalities in accordance with aspects of the present technique. For example, the single detector detects white light reflected from the specimen and luminescent light emitted via luminescence and generates a detector output signal in response to the detected light. The detector is generally formed by a plurality of detector elements (cells), which detect the scattered, reflected, or emitted light detectable by each of the two or more optical imaging modalities. For example, the detector may include multiple rows or columns of detector elements arranged in a two-dimensional array. Each detector element, when impacted by a light flux, produces an electrical signal proportional to the absorbed light flux at the position of the individual detector element in detector. These signals are acquired through read-out electronics or data readout circuitry coupled to the detector cells. The signals may then be processed to reconstruct or generate an image of the specimen.

Additionally, in certain embodiments, one or more optical devices, such as a dichroic mirror or a beam splitter, may be employed by for splitting the scattered or emitted light and directing light from respective optical imaging modalities to the corresponding regions in the single detector.

The illumination sources are controlled by a system controller, which furnishes power, control signals and so forth for examination sequences. For example, in certain embodiments, the system controller may multiplex the visible light and an excitation light in time via a multiplexing system. In one embodiment, signals may be multiplexed using time-division multiplexing, in which the multiple signals are carried over the same channel in alternating time slots.

Moreover, the detector may be coupled to the system controller, which controls the acquisition of the signals generated in the detector. The system controller may also execute various signal processing and filtration functions, such as for initial adjustment of dynamic ranges, interleaving of digital image data, and so forth. In general, system controller commands operation of the scope to execute examination protocols and to process acquired data. In the present context, system controller may also include signal-processing circuitry, which may employ a general purpose or application-specific digital computer, and associated memory circuitry. The associated memory circuitry may store programs and routines executed by the computer, configuration parameters, and image data. For example, the associated memory circuitry may store programs or routines for reconstructing image from the detector output signal.

The system controller may include data acquisition circuitry for receiving data collected by readout electronics of the detector. In particular, the data acquisition circuitry typically receives sampled analog signals from the detector and converts the data to digital signals for subsequent processing by a processor. The detector output signal may be transmitted to the system controller over a wired or a wireless link.

The processor is typically coupled to the system controller and may include a microprocessor, digital signal processor, microcontroller, as well as other devices designed to carry out logic and processing operations. The data collected by the data acquisition circuitry may be transmitted to the processor for subsequent processing such as reconstruction. For example, the data collected from the detector may undergo pre-processing and calibration at the data acquisition circuitry within system controller or the processor to condition the data to represent the specimen. The processed data may then be reordered, filtered, and reconstructed to formulate an image of the imaged area. Once reconstructed, the image generated by the scope reveals the image.

The processor may comprise or communicate with a memory that can store data processed by the processor or data to be processed by the computer. Any type of computer accessible memory device capable of storing the desired amount of data or code may be utilized by such an exemplary multi-mode scope. Moreover, the memory may comprise one or more memory devices, such as magnetic or optical devices, of similar or different types, which may be local or remote to the scope. The memory may store data, processing parameters, or computer programs comprising one or more routines for performing the reconstruction processes. Furthermore, memory may be coupled directly to system controller to facilitate the storage of acquired data.

The processor may also be adapted to control features enabled by the system controller, for example, acquisition. Furthermore, the processor may be configured to receive commands from an operator via an operator workstation that may be equipped with a keyboard or other input devices. An operator may thereby control the scope via the operator workstation. The operator may observe the reconstructed image and other data relevant to the system from operator workstation, initiate imaging, and otherwise control the system.

The scope may be equipped with or connectable to a display unit or a printer. The display unit coupled to the operator workstation may be utilized to observe the reconstructed image. The image may be displayed at a near video rate. Additionally, the printer coupled to the operator workstation may print the image. The display and the printer may also be connected to the processor, either directly or via the operator workstation. Further, the operator workstation may also be coupled to a picture archiving and communications system (PACS). It should be noted that PACS might be coupled to a remote system or to an internal or external network, so that others at different locations may gain access to the image data.

One or more operator workstations may be linked in the system for system controlling functions such as outputting system parameters, requesting examinations, viewing images. In general, displays, printers, workstations, and similar devices supplied with the system may be local to the data acquisition components, or may be remote from these components, such as elsewhere within an institution or hospital, or in an entirely different location, linked to the scope via one or more configurable networks, such as internet or virtual private networks.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A multimodal optical imaging system comprising
   (a) filter assembly comprising:
      a disk, the disk comprising:
         at least one filter, each respective filter formed in a different respective portion of the disk; and
         one or more light access sites, each respective light access site formed in different respective portions of the disk than the respective filters;
      a retaining ring enclosing the disk; and
      one or more rotational actuators positioned between an exterior surface of the disk and an interior surface of the retaining ring;
      wherein the one or more rotational actuators engage the exterior surface of the disk to rotate the disk within the retaining ring when in use;
   (b) an optical scope including a light sensor and a light source,
   wherein the filter assembly is attached to an end of the scope.

2. The multimodal optical imaging system of claim 1, further comprising one or more access apertures, each respective access aperture formed in a different respective portion of the disk than the respective filters.

3. The multimodal optical imaging system claim 1, wherein the at least one filter comprises an emission filter, an excitation filter or both an emission filter and an excitation filter.

4. The multimodal optical imaging system of 3, wherein the excitation filter comprises a fluorescent filter, a notch filter, a bandpass filter, or a multiple bandpass filter.

5. The multimodal optical imaging system of claim 3, wherein the disk includes multiple excitation filters selected from a fluorescent filter, a notch filter, a band-pass filter, a multiple band-pass filter, or a combination thereof.

6. The multimodal optical imaging system of claim 3, wherein the disk includes multiple emission filters selected from a notch filter, a band-pass filter, a long-pass filter, or combinations thereof.

7. The multimodal optical imaging system of claim 3, wherein the excitation filter blocks light in a wavelength range of 600 nm to 700 nm.

8. The multimodal optical imaging system of claim 3, wherein the emission filter blocks light in a wavelength range of 400 nm to 600 nm.

9. The multimodal optical imaging system of claim 1, wherein the one or more rotational actuators engage the interior surface of the retaining ring to rotate the disk within the retaining ring.

10. The multimodal optical imaging system of claim 1, wherein the disk further comprises one or more access apertures.

11. The multimodal optical imaging system of claim 10, wherein at least one access aperture is a light access site.

12. The multimodal optical imaging system of claim 11, wherein the light access site has a diameter less than 4 mm.

13. The multimodal optical imaging system of claim 10, wherein some or all of the access apertures have a diameter less than 4 mm.

14. The multimodal optical imaging system of claim 1, wherein the disk and the rotational actuators include a plurality of grooves that interleave to rotate the disk of the retaining ring when the rotational actuator applies rotational force.

15. The multimodal optical imaging system of claim 1, wherein the interior surface includes a plurality of grooves that interleave with grooves on the rotational actuators when the rotational actuator applies rotational force.

16. The multimodal optical imaging system of claim 1, wherein the retaining ring is attached to a distal end of a cylindrical tube.

17. The multimodal optical imaging system of claim 1, further comprising an attachment element positioned at a proximal end of a cylindrical tube.

18. The multimodal optical imaging system of claim 1, wherein excitation light is delivered separately from an excitation source via a fiber optic cable running through an access aperture in the filter assembly.

19. The multimodal optical imaging system of claim 1, wherein excitation light is delivered via an excitation source disposed onboard the filter assembly.

20. The multimodal optical imaging system of claim 1, further comprising a system controller.

21. A method of multimodal image acquisition comprising,
   (a) providing the multimodal optical imaging system of claim 1;
   (b) applying light of a first preselected wave length to an image target through an excitation filter on the disk of the filter assembly;
   (c) sensing reflected light from the image target;
   (d) rotating the disk to displace the excitation filter;
   (e) applying light of a second preselected wave length to the image target; and
   (f) sensing the reflected light from the image target.

* * * * *